United States Patent
Fan et al.

(10) Patent No.: US 11,297,658 B2
(45) Date of Patent: Apr. 5, 2022

(54) PRACH SCHEDULING METHOD, SCHEDULED PRACH TRANSMISSION METHOD, NETWORK NODE AND USER EQUIPMENT

(71) Applicant: Telefonaktiebolaget LM Ericsson (publ), Stockholm (SE)

(72) Inventors: Rui Fan, Beijing (CN); Jinhua Liu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 551 days.

(21) Appl. No.: 15/517,123

(22) PCT Filed: Dec. 9, 2016

(86) PCT No.: PCT/CN2016/109283
§ 371 (c)(1),
(2) Date: Apr. 5, 2017

(87) PCT Pub. No.: WO2018/103092
PCT Pub. Date: Jun. 14, 2018

(65) Prior Publication Data
US 2018/0270859 A1 Sep. 20, 2018

(51) Int. Cl.
*H04W 74/08* (2009.01)
*H04W 72/12* (2009.01)
(Continued)

(52) U.S. Cl.
CPC ......... *H04W 74/085* (2013.01); *H04L 5/0053* (2013.01); *H04W 72/0446* (2013.01);
(Continued)

(58) Field of Classification Search
None
See application file for complete search history.

(56) References Cited

U.S. PATENT DOCUMENTS

2010/0273494 A1* 10/2010 Iwai .................... H04L 27/2613
455/450
2012/0002606 A1* 1/2012 Vujcic ................. H04W 36/385
370/328
(Continued)

FOREIGN PATENT DOCUMENTS

CN 101873707 A 10/2010
CN 102123432 A 7/2011
(Continued)

OTHER PUBLICATIONS

Nokia Networks, "PRACH Configuration for MTC", 3GPP Draft; R1-155143, vol. RAN WG1, No. Malmo, Sweden, Oct. 4, 2015, XP051002127, Retrieved from the Internet: URL: http://www.3gpp.org/ftp/Meetings_3GPP_SYNC/RAN1/Docs/.
(Continued)

*Primary Examiner* — Jeffrey M Rutkowski
*Assistant Examiner* — Mehedi S Aley
(74) *Attorney, Agent, or Firm* — Sage Patent Group

(57) ABSTRACT

The present disclosure provides a PRACH scheduling method at a network node, comprising: generating a scheduling message which includes at least resource block RB assignment information for physical random access channel PRACH, the RB assignment information for PRACH indicating uplink resource for a user equipment UE to transmit a PRACH message; and transmitting the scheduling message on a downlink channel to the UE. The present disclosure also provides a corresponding network node, a scheduled PRACH transmission method at a UE, and a corresponding UE.

9 Claims, 6 Drawing Sheets

(51) Int. Cl.
  *H04W 76/38* (2018.01)
  *H04W 76/27* (2018.01)
  *H04L 5/00* (2006.01)
  *H04W 72/04* (2009.01)

(52) U.S. Cl.
  CPC ....... *H04W 72/1289* (2013.01); *H04W 76/27* (2018.02); *H04W 76/38* (2018.02); *H04W 72/042* (2013.01); *H04W 72/1205* (2013.01); *H04W 74/08* (2013.01)

(56) References Cited

U.S. PATENT DOCUMENTS

| | | | | |
|---|---|---|---|---|
| 2014/0247816 A1* | 9/2014 | Kim | ................. | H04W 72/0446 370/336 |
| 2015/0043490 A1* | 2/2015 | Wu | ................. | H04W 74/0833 370/329 |
| 2015/0085689 A1 | 3/2015 | Vos | | |
| 2015/0304994 A1* | 10/2015 | Kim | ................. | H04W 72/042 370/280 |
| 2018/0109976 A1* | 4/2018 | Ly | ................. | H04L 1/005 |
| 2018/0124749 A1* | 5/2018 | Park | ................. | H04W 74/08 |

FOREIGN PATENT DOCUMENTS

| | | | |
|---|---|---|---|
| CN | 102271418 | * | 12/2011 |
| CN | 102271418 A | * | 12/2011 |
| CN | 102271418 A | | 12/2011 |
| CN | 102938938 A | | 2/2013 |
| WO | 2016/025899 A1 | | 2/2016 |

OTHER PUBLICATIONS

Extended European Search Report issued in corresponding EP Application No. 16923502.5 dated Jun. 9, 2020, 7 Pages.

* cited by examiner

PRACH SCHEDULING METHOD, SCHEDULED PRACH TRANSMISSION METHOD, NETWORK NODE AND USER EQUIPMENT

TECHNICAL FIELD

The present disclosure generally relates to the technical field of telecommunication, and particularly to a Physical Random Access CHannel (PRACH) scheduling method, a scheduled PRACH transmission method, a network node using the PRACH scheduling method, and a user equipment (UE) using the scheduled PRACH transmission method.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In Long-Term Evolution (LTE), a random access procedure is a very important procedure needed for many cases. For example, when a UE is in a RRC (Radio Resource Control)_Idle state, if the UE needs to start an uplink (UL) data transmission, the UE needs to initiate a random access procedure, or if a network node needs to send downlink (DL) data to the UE, the network node will send a paging message to the UE so as to trigger the UE to initiate a random access procedure. When the UE is in a RRC_Connected state but loses UL synchronization, the network node serving the UE will send a Physical Downlink Control CHannel (PDCCH) order message (in a special bit pattern) defined in LTE to the UE so as to trigger the UE to initiate a random access procedure to gain the UL synchronization.

UL time/frequency resource for transmitting a PRACH message (which is also referred to as 'PRACH' for short) in a random access procedure is configured via a RRC message. And the UL time/frequency resource for PRACH is shared by all UEs served by the network node, and is shared by different types of random access procedures, i.e. no matter whether the UE is in the RRC_Idle state or in the RRC_connected state, a random access procedure is triggered based on DL data transmission or UL data transmission.

The PDCCH order message (which is also referred to as 'PDCCH order' for short) is a design in LTE to support a contention-free random access procedure when the UE is in the RRC_Connected state but lose its UL synchronization. The PDCCH order is a special design of Downlink Control Information (DCI) format 1A scrambled by Cell-Radio Network Temporary Identifier (C-RNTI). In this DCI format 1A, a designated preamble is included so that the UE knows which preamble may be used when it needs to transmit the PRACH message. Radio Block (RB) assignment bits are set 1 in the DCI format 1A which is interpreted as invalid resource allocation.

A problem with current solutions is that a PRACH subframe (i.e., a subframe for the PRACH message) is RRC-configured, i.e., configured by a RRC message. A target of the next generation of wireless communication network is to support a flexible subframe, i.e. the UE does not know a direction of a subframe until the subframe is scheduled. Therefore, the number of static UL or DL subframes should be kept as small as possible. If too many PRACH subframes are configured, it will result in too many static UL subframes, which reduce flexibility for dynamic subframe sharing between UL and DL. If a less number of PRACH subframes are configured, each time when the UE needs to transmit PRACH, it has to wait for a long time until the subframe for PRACH arrives, then a delay will be incurred and confliction from different UEs using PRACH resource may occur as well.

SUMMARY

Accordingly, at least some objects of the present disclosure are to enable resource scheduling for PRACH at the network node side, and to enable an on-demand scheduled PRACH transmission at the UE side, so as to initiate a random access procedure as needed, e.g. when the network node needs to page a UE in the RRC_Idle or RRC_Dormant state, or when the network node needs to transmit DL data to a UE in the RRC_Connected state but the UE is out of UL synchronization.

According to one aspect of the present disclosure, a method at a network node is provided. The method comprises: generating a scheduling message which includes at least resource block RB assignment information for physical random access channel PRACH, the RB assignment information for PRACH indicating uplink resource for a user equipment UE to transmit a PRACH message; and transmitting the scheduling message on a downlink channel to the UE.

In an embodiment of the method, in a case that the UE is in a radio resource control RRC_Connected state, or a time period since the UE enters a RRC_Dormant state from the RRC_Connected state is no more than a predetermined threshold, transmitting the scheduling message on the downlink channel to the UE comprises:
transmitting the scheduling message by means of downlink control information DCI on a downlink control channel; or
transmitting the scheduling message by means of a MAC control element on a downlink data channel.

In an embodiment of the method, in a case that the UE is in a radio resource control RRC_Idle state, or a time period since the UE enters a RRC_Dormant state from a RRC_Connected state is more than a predetermined threshold, transmitting the scheduling message on the downlink channel to the UE comprises:
transmitting the scheduling message by means of downlink control information DCI on a downlink control channel; and
the method further comprises:
transmitting data on a downlink data channel associated with the downlink control channel, wherein the data transmitted on the associated downlink data channel comprise a paging message including a UE ID of the UE, so that the UE can verify, based on the UE ID, that the obtained scheduling message is transmitted for its own.

In an embodiment of the method, the scheduling message further includes additional RB assignment information for an uplink data channel, the additional RB assignment information indicating uplink resource for the UE to transmit data on the uplink data channel.

According to another aspect of the present disclosure, a network node is provided. The network node comprises: a generation unit, configured to generate a scheduling message which includes at least resource block RB assignment information for physical random access channel PRACH, the RB assignment information for PRACH indicating uplink resource for a user equipment UE to transmit a PRACH message; and a transceiver, configured to transmit the scheduling message on a downlink channel to the UE.

In an embodiment of the network node, in a case that the UE is in a radio resource control RRC_Connected state, or a time period since the UE enters a RRC_Dormant state from the RRC_Connected state is no more than a predetermined threshold, the transceiver is configured to:
transmit the scheduling message by means of downlink control information DCI on a downlink control channel; or
transmit the scheduling message by means of a MAC control element on a downlink data channel.

In an embodiment of the network node, in a case that the UE is in a radio resource control RRC_Connected state, or a time period since the UE enters a RRC_Dormant state from the RRC_Connected state is more than a predetermined threshold, the transceiver is configured to:
transmit the scheduling message by means of downlink control information DCI on a downlink control channel; and transmit data on a downlink data channel associated with the downlink control channel, wherein the data transmitted on the associated downlink data channel comprise a paging message including a UE ID of the UE, so that the UE can verify, based on the UE ID, that the obtained scheduling message is transmitted for its own.

In an embodiment of the network node, the scheduling message further includes additional RB assignment information for an uplink data channel, the additional RB assignment information indicating uplink resource for the UE to transmit data on the uplink data channel.

According to another aspect of the present disclosure, a network node is provided. The network node comprises: a communication interface arranged for wireless communication, one or more processors, and a memory including instructions which, when executed by said one or more processors, cause said network node to: generate a scheduling message which includes at least resource block RB assignment information for physical random access channel PRACH, the RB assignment information for PRACH indicating uplink resource for a user equipment UE to transmit a PRACH message; and transmit the scheduling message on a downlink channel to the UE.

In an embodiment of the network node, in a case that the UE is in a radio resource control RRC_Connected state, or a time period since the UE enters a RRC_Dormant state from the RRC_Connected state is no more than a predetermined threshold, the instructions which, when executed by said one or more processors, cause the network node to transmit the scheduling message on the downlink channel to the UE includes instructions which, when executed by said one or more processors, cause the network node to:
transmit the scheduling message by means of downlink control information DCI on a downlink control channel; or
transmit the scheduling message by means of a MAC control element on a downlink data channel.

In an embodiment of the network node, in a case that the UE is in a radio resource control RRC_Connected state, or a time period since the UE enters a RRC_Dormant state from the RRC_Connected state is more than a predetermined threshold, the instructions which, when executed by said one or more processors, cause the network node to transmit the scheduling message on the downlink channel to the UE further includes instructions which, when executed by said one or more processors, cause the network node to:
transmit the scheduling message by means of downlink control information DCI on a downlink control channel; and transmit data on a downlink data channel associated with the downlink control channel, wherein the data transmitted on the associated downlink data channel comprise a paging message including a UE ID of the UE, so that the UE can verify, based on the UE ID, that the obtained scheduling message is transmitted for its own.

In an embodiment of the network node, the scheduling message further includes additional RB assignment information for an uplink data channel, the additional RB assignment information indicating uplink resource for the UE to transmit data on the uplink data channel.

According to another aspect of the present disclosure, a method at a UE is provided. The method comprises: monitoring a downlink control channel; if control information on the downlink control channel is detected, obtaining (S603) a scheduling message which includes at least resource block RB assignment information for physical random access channel PRACH, the RB assignment information for PRACH indicating uplink resource for the UE to transmit a PRACH message, at least based on the control information on the downlink control channel; and transmitting, to a network node serving the UE, at least the PRACH message according to the obtained scheduling message In an embodiment of the method, in a case that the UE is in a radio resource control RRC_Connected state, or a time period since the UE enters a RRC_Dormant state from the RRC_Connected state is no more than a predetermined threshold, obtaining the scheduling message comprises:
obtaining the scheduling message transmitted by means of downlink control information DCI on the downlink control channel; or
obtaining configuration for an associated downlink data channel from the detected control information on the downlink control channel; and detecting the scheduling message transmitted by means of a MAC control element on the associated downlink data channel, according to the obtained configuration for the associated downlink data channel.

In an embodiment of the method, in a case that the UE is in a radio resource control RRC_Idle state, or a time period since the UE enters a RRC_Dormant state from a RRC_Connected state is more than a predetermined threshold, obtaining the scheduling message comprises:
obtaining, based on the detected control information on the downlink control channel, data transmitted on a downlink data channel associated with the downlink control channel, wherein the data transmitted on the associated downlink data channel comprise a paging message including a UE ID of the UE; and
obtaining the scheduling message transmitted by means of downlink control information DCI on the downlink control channel, and verifying, based on the UE ID, that the obtained scheduling message is transmitted for its own.

In an embodiment of the method, the scheduling message further includes additional RB assignment information for an uplink data channel; and the method further comprises:
transmitting uplink data on the uplink data channel indicated by the additional RB assignment information.

According to another aspect of the present disclosure, a UE is provided. The UE comprises: a monitoring unit, configured to monitor a downlink control channel; an obtaining unit, configured to, if control information on the downlink control channel is detected, obtain a scheduling message which includes at least resource block RB assignment information for physical random access channel PRACH, the RB assignment information for PRACH indicating uplink resource for the UE (1200) to transmit a PRACH message, at least based on the control information on the downlink control channel; and a transceiver, configured to transmit, to a network node serving the UE, at least the PRACH message according to the obtained scheduling message.

In an embodiment of the UE, in a case that the UE is in a radio resource control RRC_Connected state, or a time period since the UE enters a RRC_Dormant state from the RRC_Connected state is no more than a predetermined threshold, the obtaining unit is configured to:
obtain the scheduling message transmitted by means of downlink control information DCI on the downlink control channel; or
obtain configuration for an associated downlink data channel from the detected control information on the downlink control channel; and detect the scheduling message transmitted by means of a MAC control element on the associated downlink data channel, according to the obtained configuration for the associated downlink data channel.

In an embodiment of the UE, in a case that the UE is in a radio resource control RRC_Idle state, or a time period since the UE enters a RRC_Dormant state is more than a predetermined threshold, the obtaining unit is configured to:
obtain, based on the detected control information on the downlink control channel, data transmitted on a downlink data channel associated with the downlink control channel, wherein the data transmitted on the associated downlink data channel comprise a paging message including a UE ID of the UE; and
obtain the scheduling message transmitted by means of downlink control information DCI on the downlink control channel, and verify, based on the UE ID, that the obtained scheduling message is transmitted for its own.

In an embodiment of the UE, the scheduling message further includes additional RB assignment information for an uplink data channel; and the transceiver is configured to transmit uplink data on the uplink data channel indicated by the additional RB assignment information.

According to another aspect of the present disclosure, a UE is provided. The UE comprises: a communication interface arranged for wireless communication, one or more processors, and a memory including instructions which, when executed by said one or more processors, cause said UE to: monitor a downlink control channel; if control information on the downlink control channel is detected, obtain a scheduling message which includes at least resource block RB assignment information for physical random access channel PRACH, the RB assignment information for PRACH indicating uplink resource for the UE (1200) to transmit a PRACH message, at least based on the control information on the downlink control channel; transmit, to a network node serving the UE, at least the PRACH message according to the obtained scheduling message.

In an embodiment of the UE, in a case that the UE is in a radio resource control RRC_Connected state, or a time period since the UE enters a RRC_Dormant state from the RRC_Connected state is no more than a predetermined threshold, the instructions which, when executed by said one or more processors, cause the UE to obtain the scheduling message includes instructions which, when executed by said one or more processors, cause the UE to:
obtain the scheduling message transmitted by means of downlink control information DCI on the downlink control channel; or
obtain configuration for an associated downlink data channel from the detected control information on the downlink control channel; and detect the scheduling message transmitted by means of a MAC control element on the associated downlink data channel, according to the obtained configuration for the associated downlink data channel.

In an embodiment of the UE, in a case that the UE is in a radio resource control RRC_Idle state, or a time period since the UE enters a RRC_Dormant state is more than a predetermined threshold, the instructions which, when executed by said one or more processors, cause the UE to obtain the scheduling message includes instructions which, when executed by said one or more processors, cause the UE to:
obtain, based on the detected control information on the downlink control channel, data transmitted on a downlink data channel associated with the downlink control channel, wherein the data transmitted on the associated downlink data channel comprise a paging message including a UE ID of the UE (1200); and
obtain the scheduling message transmitted by means of downlink control information DCI on the downlink control channel, and verify, based on the UE ID, that the obtained scheduling message is transmitted for its own.

In an embodiment of the UE, the scheduling message further includes additional RB assignment information for an uplink data channel, and the instructions which, when executed by said one or more processors, cause the UE to transmit uplink data on the uplink data channel indicated by the additional RB assignment information.

In an embodiment of the method at the network node, of the network node, of the method at the UE, or of the UE, a subframe for the UE to transmit at least the PRACH message is predefined.

In an embodiment of the method at the network node, of the network node, of the method at the UE, or of the UE, the scheduling message further includes subframe assignment information which indicates a subframe scheduled by the network node for the UE (1200) to transmit at least the PRACH message, the subframe assignment information including:
information on a time interval between a subframe for scheduling at least the uplink resource for the PRACH message and a subframe for transmitting at least the PRACH message; or
information indicating which subframe for transmitting at least the PRACH message.

The technical solutions of the present disclosure may at least have beneficial effects as follows.

By providing a resource scheduling mechanism for PRACH at the network node side and providing an on-demand scheduled PRACH transmission mechanism at the UE side, PRACH can be transmitted very flexibly at any subframe and at any PRB where it is necessary. The delay incurred in the random access procedure using the RRC-configured PRACH mechanism in which the resource for PRACH is configured by the RRC message as previously discussed may be reduced. Furthermore, if different UEs use the scheduled PRACH transmissions, there is no collision caused by the RRC-configured PRACH transmission mechanism as previously discussed, since each UE is scheduled for its PRACH transmission.

BRIEF DESCRIPTION OF THE DRAWINGS

The objects, advantages and characteristics of the present disclosure will be more apparent, according to descriptions of preferred embodiments in connection with the drawings, on which.

Figure 1:
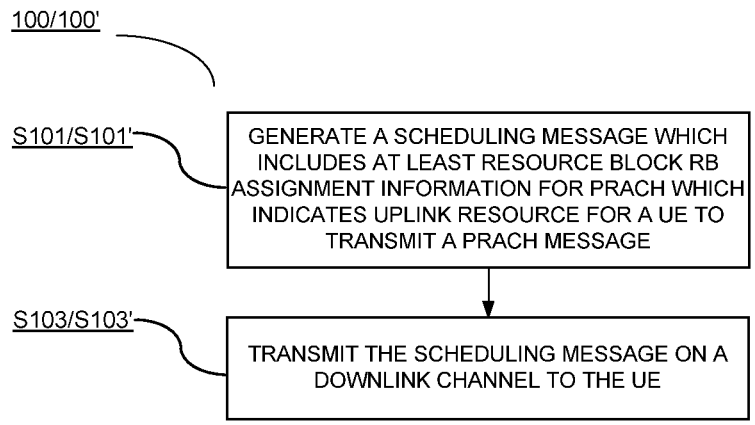
FIG. 1 illustratively shows a flowchart of a PRACH scheduling method according to an exemplary embodiment of the present disclosure.

It should be noted that throughout the drawings, same or similar reference numbers are used for indicating same or similar elements; various parts in the drawings are not drawn to scale, but only for an illustrative purpose, and thus should not be understood as any limitations and constraints on the scope of the present disclosure.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

The techniques described herein may be used for various wireless communication networks such as CDMA, TDMA, FDMA, OFDMA, SC-FDMA, LTE and other networks developed in the future. The terms "network" and "system" are often used interchangeably. For illustration only, certain aspects of the techniques are described below for the next, i.e. the 5th generation of wireless communication network. However, it will be appreciated by the skilled in the art that the techniques described herein may also be used for other wireless networks such as LTE and corresponding radio technologies mentioned herein as well as wireless networks and radio technologies proposed in the future.

As used herein, the term "network node" refers to any of entities capable of accessing to any of wireless communication networks. By way of example and not limitation, the network node may comprise a base station (BS), a node B (NodeB or NB), an evolved NodeB (eNodeB or eNB), and so forth.

The term "UE" used herein refers to any device that can access a wireless communication network and receive services therefrom. By way of example, a UE may include, but is not limited to, a mobile phone, a cellular phone, a smart phone, a tablet, a wearable device, a personal digital assistant (PDA), and the like.

The basic principles of the present disclosure consist in that when a requirement for initiating a random access procedure is triggered,
at the network node side, the UL resource(s) for transmitting the PRACH message is scheduled by a generated scheduling message which includes at least scheduling information for PRACH, but is not configured by the RRC message; and
at the UE side, the PRACH message is transmitted on the scheduled UL resource(s) as indicated in the scheduling message received by the UE.

Trigger events may comprise, e.g., the network node needs to transmit DL data to a UE in the RRC_Connected state but the UE is out of UL synchronization, the network node needs to page a UE in the RRC_Idle or RRC_Dormant state, and the like.

Hereinafter, PRACH scheduling methods at the network node side according to embodiments of the present disclosure will be described with reference to FIGS. 1-4.

First, with reference to FIG. 1, FIG. 1 illustratively shows a flowchart of a general PRACH scheduling method according to an exemplary embodiment of the present disclosure, which is performed at the network node in response to any of trigger events for triggering a random access procedure.

As shown in FIG. 1, the method 100 at the network node may comprise steps S101 and S103.

In response to any of the trigger events for triggering a random access procedure, in step S101, the network node generates a scheduling message which includes at least RB assignment information for PRACH, the RB assignment information for PRACH indicating UL frequency resource, i.e., PRBs (Physical Resource Blocks), for the UE to transmit a PRACH message (MSG1). Besides the RB assignment information, the scheduling message may include MCS (Modulation and Coding Scheme), subframe assignment information which indicates UL time resource, i.e., a subframe, scheduled by the network node for the UE to transmit the PRACH message and will be described later, etc.

Then in step S103, the network node transmits the generated scheduling message on a DL channel to the UE.

Since UE has three RRC states in the next generation of wireless communication network, i.e., a RRC_Connected state, a RRC_Idle state, and a RRC_Dormant state, there may be three different scenarios corresponding to the three RRC states of the UE to be considered for particular implementations of the method 100.

Scenario 1: UE is in the RRC_Connected state, but loses its UL synchronization with the network node;

Scenario 2: UE is in the RRC_Idle state; and

Scenario 3: UE is in the RRC_Dormant state.

It should be noted that since the RRC_Dormant state is an intermediate state between the RRC_Connected state and the RRC_Idle state, if a time period since the UE enters the RRC_Dormant state from the RRC_Connected state is no more than a predetermined threshold, the network node may use the same PRACH scheduling method as that used in Scenario 1 for scheduling the UL resource for PRACH; and if a time period since the UE enters the RRC_Dormant state from the RRC_Connected state is more than the predetermined threshold, the network node may use the same PRACH scheduling method as that used in Scenario 2 for scheduling the UL resource for PRACH.

Therefore, particular implementations of the PRACH scheduling method 100 in Scenario 1 and Scenario 2 will be described in detail hereinafter with reference to FIGS. 2-3 and 4, respectively. Particular implementations of the PRACH scheduling method 100 for Scenario 3 will be omitted accordingly, and may refer to the descriptions for Scenario 2 and Scenario 1 depending on whether the time period since the UE enters the RRC_Dormant state from the RRC_Connected state is more than the predetermined threshold or not, respectively.

Figure 2:
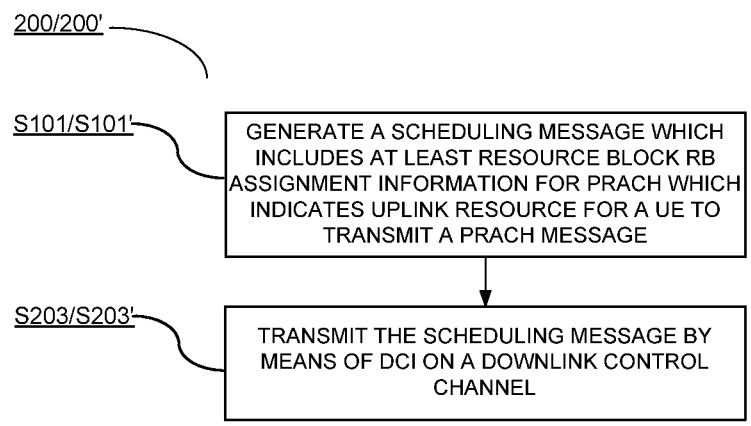
FIG. 2 illustratively shows a flowchart of a PRACH scheduling method in a case that the UE is in a RRC_Connected state or that the UE has been in a RRC_Dormant state for no more than a predetermined period, according to an exemplary embodiment of the present disclosure.

FIG. 2 illustratively shows a flowchart of a PRACH scheduling method applied in Scenario 1 according to an exemplary embodiment of the present disclosure.

In Scenario 1, the UE is in the RRC_Connected state. Thus, the network node has UE context (especially, C-RNTI of the UE), and knows that the UE is within its cell. When the network node wants to transmit DL data to the UE, it notices that the UE loses its UL synchronization. Thus, the network node needs to trigger the UE to transmit PRACH on UL to get UL synchronized.

As shown in FIG. 2, the method 200 at the network node may comprise steps S101 and S203.

In response to the above trigger event, in step S101, the network node generates a scheduling message which includes at least scheduling information for PRACH. The scheduling information for PRACH is used for scheduling UL resource for the UE to transmit a PRACH message.

Then in step S203, the network node transmits the generated scheduling message by means of DCI (Downlink Control Indicator) on a DL control channel, e.g. PDCCH (Physical Downlink Control CHannel), to the UE. The RB assignment information can be contained in the DCI. Since the PRBs to transmit the PRACH message are contiguous and the number of PRBs is fixed (e.g., 6 in LTE), the only information needed is a start position of the PRBs. For 100 PRBs, 7 bits is enough to notify any start location. If these 7 bits are larger overhead, the start PRB can also be within some limited positions to reduce the number of bits as needed. For example, if the possible PRB start position is limited to 16, 4 bits are enough and these 4 bits will not result in any overhead at least according to the current LTE design. The mapping from possible PRB start location to those bits in DCI can be indicated in broadcasted RRC signaling or predefined in specifications.

In this embodiment, the scheduling message is conveyed on a L1 physical control channel.

Although the PDCCH order in LTE as previously mentioned is also conveyed in the L1 physical control channel to let the UE know it needs to transmit PRACH on UL, all of RB assignment bits are set to 1 in the PDCCH order, which is interpreted as invalid resource allocation. Also, a designate preamble is included in the PDCCH order, so that the random access procedure is a contention-free random access procedure.

Different from the PDCCH order in LTE, the RB assignment bits for PRACH used in the method 200 of the present embodiment are set to desired PRB(s) where the network node schedules for the UE to transmit the PRACH message. Furthermore, it is not necessary to include a designated preamble in the scheduling message as in the PDCCH order in LTE, since in the present embodiment, UL resource for PRACH is scheduled and thus there is no confliction at all. Of course, in the scheduling message transmitted in the method 200, a designated preamble can additionally be included for purposes of further improving network performance, e.g., for reducing blind detection at the network side or multiplexing multiple PRACH transmissions from different UEs etc.

The above descriptions concern how UL frequency resource is scheduled by the network node for the UE to transmit the PRACH message.

Regarding how UL time resource is scheduled by the network node for the UE to transmit the PRACH message, in one implementation, the subframe for the UE to transmit the PRACH message may be predefined by specifications.

In another implementation, if there is more than one option for a subframe being scheduled to transmit the PRACH message, e.g., the UE may transmit the PRACH message at a subframe at which it receives the scheduling message, or at n subframes later than the subframe (n is a positive integer, e.g., 4), subframe arrangement information may be further included in the scheduling message for indicating the subframe scheduled by the network node for the UE to transmit the PRACH message.

The subframe assignment information may include information on a time interval between a subframe for scheduling the UL resource for the PRACH message and a subframe for transmitting the PRACH message.

Alternatively, the subframe assignment information may include information explicitly indicating which subframe is scheduled to transmit the PRACH message.

In another embodiment, the scheduling message may be transmitted on a DL data channel, e.g., PDSCH (Physical Downlink Shared CHannel), instead of the DL control channel, which will be described with reference to FIG. 3.

Figure 3:
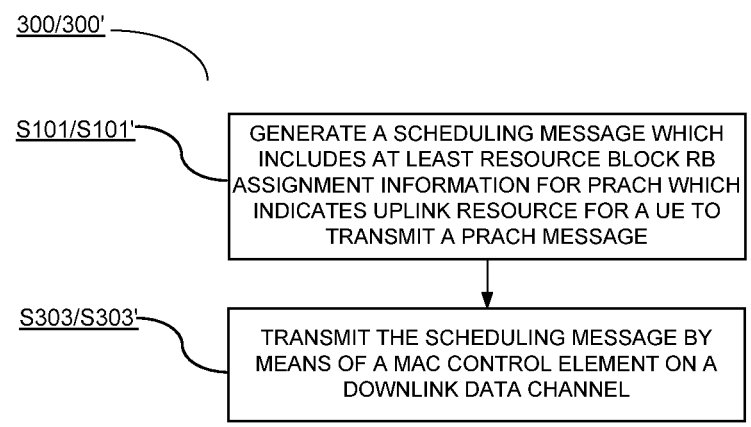
FIG. 3 illustratively shows a flowchart of a PRACH scheduling method in a case that the UE is in a RRC_Connected state or that the UE has been in a RRC_Dormant state for no more than a predetermined period, according to another exemplary embodiment of the present disclosure.

FIG. 3 illustratively shows a flowchart of a PRACH scheduling method applied in Scenario 1 according to the other embodiment of the present disclosure. The only difference from the embodiment as shown in FIG. 2 consists in that the PRACH scheduling method 300 comprises step S303, instead of step S203 in FIG. 2.

In step S303, the network node transmits the generated scheduling message by means of a MAC control element on a DL data channel to the UE. In this embodiment, the RB assignment information for PRACH, indicating the PRB(s) scheduled by the network node for the UE to transmit the PRACH message, is contained in the MAC control element.

The approaches of scheduling the UL time resource for the UE to transmit the PRACH message in the method 300 are identical with those in the method 200, and thus description thereof will be omitted here for simplicity.

Hereinafter, a particular implementation of the PRACH scheduling method in Scenario 2 will be described in detail with reference to FIG. 4. As shown in FIG. 4, the PRACH scheduling method 400 may comprise steps S101, S403 and S405. It should be noted that step S403 in method 400 is similar with step S203 in method 200, and steps with the same reference number S101 in methods 100-400 are identical.

In Scenario 2, the UE is in the RRC_Idle state. Thus, the network node does not know C-RNTI of the UE and where the UE is.

Accordingly, different from the method 200 of FIG. 2, if the network node needs to send DL data to the UE, the method 400 further comprises step S405 for paging, via Paging-RNTI ('P-RNTI' for short), the UE to which the network node intends to transmit the DL data, besides step S101 of generating a scheduling message which includes at least RB assignment information for PRACH and step S403 of transmitting the generated scheduling message by means of DCI on a DL control channel (which will be described later).

In particular, in step S405, the network node transmits data on a DL data channel associated with the DL control channel, wherein the data transmitted on the associated DL data channel comprise a paging message including the UE ID, e.g. IMSI (International Mobile Subscriber Identification), of the UE to which the network node intends to transmit the DL data.

Furthermore, step S403 in the method 400 differs from step S203 in the method 200 in that in step S403, the network node transmits the generated scheduling message including the RB assignment information for PRACH on the DL control channel to a plurality of UEs which share the P-RNTI and receive the paging message at the same time (including the UE to which it intends to transmit the DL data), since the network node does not know the C-RNTI of the UE.

As such, the UE can obtain, from the data transmitted on the associated DL data channel, the paging message including its UE ID; and obtain the scheduling message transmitted by means of DCI on the DL control channel, and verify, based on the UE ID, that the obtained scheduling message is just transmitted for it to transmit the PRACH message to initiate the random access procedure Similar with the method 200, the RB assignment information contained in the DCI carried on the DL control channel indicates the PRBs scheduled by the network node for the UE to transmit the PRACH message.

The RB assignment information can be contained in the DCI which is used to schedule the paging message, i.e., the DCI for paging. Since the PRBs to transmit the PRACH message are contiguous and the number of PRBs is fixed (e.g., 6 in LTE), the only information needed is a start position of the PRBs. For 100 PRBs, 7 bits is enough to notify any start location. If these 7 bits are larger overhead, the start PRB can also be within some limited positions to reduce the number of bits as needed. For example, if the possible PRB start position is limited to 16, 4 bits are enough and these 4 bits will not result in any overhead at least according to the current LTE design. This is because when the paging message is scheduled by the DCI format 1A using P-RNTI, at least 4 bits are reserved. The mapping from possible PRB start location to those bits in the DCI can be indicated in broadcasted RRC signaling or predefined in specifications.

Of course, the RB assignment information can also be contained in another DCI.

The approaches of scheduling the UL time resource for the UE to transmit the PRACH message in the method 400 are identical with those in the method 200, and thus description thereof will be omitted for simplicity.

It should also be understood by the skilled in the art that although steps S403 and S405 are indicated in serial numbers, it in no way means that steps S403 and S405 are performed in an order of the serial numbers. Instead, steps S403 and S405 may be performed simultaneously or successively in any order. It is only required in embodiments of the present disclosure that steps S101 and S403 are performed sequentially.

Nowadays, a contention-based random access procedure is a four-step process, which comprises: transmitting by the UE to the network node a random access preamble (MSG1) on PRACH in UL; transmitting by the network node to the UE a random access response (MSG2) on the DL data channel; transmitting by the UE to the network node a scheduled UL transmission (MSG3) on the UL data channel; and transmitting by the network node to the UE a contention resolution (MSG4) on DL. And the embodiments previously described are adapted to the four-step process.

Recently, merging of the four-step process into a two-step process is under discussion by 3GPP. The two-step process comprises: transmitting by the UE MSG1 and MSG3 to the network node in one time instance; and transmitting by the network node MSG2 and MSG4 to the UE in another time instance. Via the two-step process, the delay of the random access procedure can be reduced significantly. Accordingly, the PRACH scheduling methods according to embodiments of the present disclosure which are adapted to the two-step process will be described. The drawings specific to those embodiments are not shown, but FIGS. 1-4 may be referred to again. In order to distinguish steps in the methods adapted to the two-step process and the methods adapted to the four-step process, "'" is additionally added to the reference numbers in FIGS. 1-4 when the methods adapted to the two-step process are described. Same applies to FIGS. 6-9 below.

Most of steps, especially the ways of transmitting the scheduling message, in the methods 100'-400' are substantially identical with those described in the methods 100-400. The only difference consists in that the scheduling message generated by the network node in the method 100'-400' includes not only the RB assignment information for PRACH, but also additional RB assignment information for an UL data channel, e.g., PUSCH (Physical Uplink Shared CHannel), which schedules UL frequency resource for the UE to transmit data on the UL data channel. Therefore, the methods 100'-400' adapted to the two-step process performed at the network node side according to embodiments of the present disclosure will be simply described hereinafter with reference to FIGS. 1-4.

As shown in FIG. 1, a general method 100' at the network node may comprise steps S101' and S103'.

In response to any of the trigger events for triggering a random access procedure, in step S101', the network node generates a scheduling message which includes not only the RB assignment information for PRACH but also RB assignment information for the UL data channel.

Then in step S103, the network node transmits the generated scheduling message on a DL channel to the UE.

In Scenario 1 where the UE is in the RRC_Connected state but loses its UL synchronization, the method 200' according to an exemplary embodiment of the present disclosure is applied, which may comprise steps S101' and S203' as shown in FIG. 2.

In step S101', the network node generates a scheduling message which includes RB assignment information for PRACH and additional RB assignment information for the UL data channel.

Then in step S203', the network node transmits the generated scheduling message by means of DCI on a DL control channel, e.g. PDCCH, to the UE. The RB assignment information for PRACH carried on the DL control channel indicates PRBs scheduled by the network node for the UE to transmit the PRACH message, and the additional RB assignment information for the UL data channel indicates PRBs scheduled by the network node for the UE to transmit data on the UL data channel. Both the RB assignment information for PRACH and the additional RB assignment information for the UL data channel are contained in the DCI.

In another embodiment applied in Scenario 1, the method 300' according to an exemplary embodiment of the present disclosure is applied, which may comprise steps S101' and S303' as shown in FIG. 3. The only difference from the embodiment as shown in FIG. 2 consists in that the method 300' comprises step S303', instead of step S203' in FIG. 2.

In step S303', the network node transmits the generated scheduling message by means of a MAC control element on a DL data channel to the UE. In this embodiment, both the RB assignment information for PRACH which indicates PRB(s) scheduled by the network node for the UE to transmit the PRACH message and the additional RB assignment information for the UL data channel which indicates PRBs scheduled by the network node for the UE to transmit data on the UL data channel are contained in the MAC control element.

Figure 4:
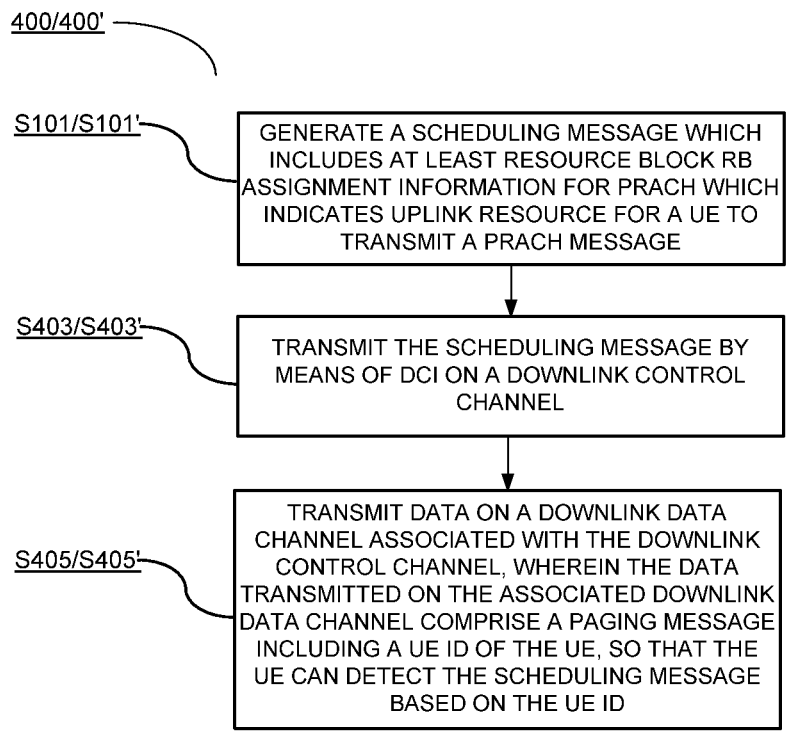
FIG. 4 illustratively shows a flowchart of a PRACH scheduling method in a case that the UE is in a RRC_Idle state or that the UE has been in a RRC_Dormant state for more than a predetermined period, according to an exemplary embodiment of the present disclosure.

In Scenario 2 where the UE is in the RRC_Idle state, the method 400' according to an exemplary embodiment of the present disclosure is applied, which may comprise steps S101', S403' and S405' as shown in FIG. 4. It should be noted that step S403' in method 400' is similar with step S203' in method 200', and steps with the same reference number S101' in methods 100'-400' are identical.

In step S101', the network node generates a scheduling message which includes RB assignment information for PRACH and additional RB assignment information for the UL data channel.

In step S405', the network node transmits data on a DL data channel associated with the DL control channel, wherein the data transmitted on the associated DL data channel comprise a paging message including the UE ID, e.g. IMSI (International Mobile Subscriber Identification), of the UE to which the network node intends to transmit the DL data.

Also, in step S403', the network node transmits the generated scheduling message including not only the RB assignment information for PRACH but also the additional RB assignment information for the UL data channel on the DL control channel to a plurality of UEs which share the P-RNTI and receive the paging message at the same time (including the UE to which it intends to transmit the DL data), since the network node does not know the C-RNTI of the UE.

As such, the UE can obtain, from the data transmitted on the associated DL data channel, the paging message including its UE ID; and obtain the scheduling message transmitted by means of the DCI on the DL control channel, and verify, based on the UE ID, that the obtained scheduling message is just transmitted for to transmit the PRACH message and to transmit the data on the UL data channel.

In the two-step process, the PRACH message and the data on the UL data channel are transmitted at the same subframe. The approaches of scheduling the UL time resource for the UE to transmit the PRACH message and to transmit the data on the UL data channel in the methods 200'-400' are identical with those in the methods 200-400, and thus description thereof will be omitted here for simplicity.

Figure 5:
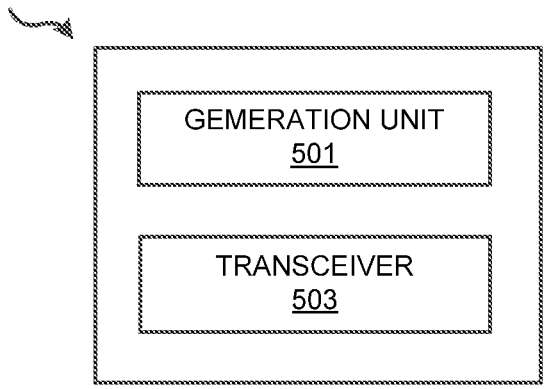
FIG. 5 illustratively shows a schematic structure diagram of a network node according to an exemplary embodiment of the present disclosure.

A structure of a network node will be described with reference to FIG. 5. FIG. 5 illustratively shows a schematic structure diagram of a network node 500 according to an embodiment of the present disclosure. The network node 500 in FIG. 5 may perform the methods 100-400 adapted to the four-step process as well as the methods 100'-400' adapted to the two-step process described previously with reference to FIGS. 1-4, respectively.

As shown in FIG. 5, the network node 500 comprises a generation unit 501 and a transceiver 503. As will be understood by the skilled in the art, common components in the network node 500 are omitted in FIG. 5 for not obscuring the idea of the present disclosure.

In a case that the network node 500 is applied in the four-step process, the generation unit 501 is configured to generate, in step S101 of the methods 100-400, a scheduling message which includes at least RB assignment information for PRACH, the RB assignment information for PRACH indicating UL frequency resource, i.e., PRBs, for the UE to transmit a PRACH message (MSG1). Besides the RB assignment information, the scheduling message may include MCS, subframe assignment information which indicates UL time resource, i.e., a subframe, scheduled by the network node for the UE to transmit the PRACH message and will be described later, etc.

The transceiver 503 is arranged to transmit, in step S103 of the method 100, the scheduling message on a DL channel to the UE.

In particular, in Scenario 1 where the UE is in the RRC_Connected state but loses its UL synchronization, the transceiver 503 is configured to transmit, in step S203, the scheduling message by means of DCI on a DL control channel.

In another embodiment applied in Scenario 1, the transceiver 503 is configured to transmit, in step S303, the scheduling message by means of a MAC control element on a DL data channel.

In Scenario 2 where the UE is in the RRC_Idle state, the transceiver 503 is configured to transmit, in step S403, the scheduling message by means of DCI on a DL control channel; and transmit, in step S405, data on a DL data channel associated with the DL control channel, wherein the data transmitted on the associated DL data channel comprise a paging message including a UE ID of the UE, so that the UE can verify, based on the UE ID, that the obtained scheduling message is transmitted for its own.

Regarding the UL time resource for the UE to transmit the PRACH message, in one implementation, the subframe for the UE to transmit the PRACH message may be predefined by specifications.

In another implementation, the subframe assignment information may include information on a time interval between a subframe for scheduling the UL resource for the PRACH message and a subframe for transmitting the PRACH message. Alternatively, the subframe assignment information may include information explicitly indicating which subframe is scheduled to transmit the PRACH message.

In a case that the network node 500 is applied in the two-step process, the generation unit 501 is configured to generate, in step S101' of the methods 100'-400', a scheduling message which includes not only RB assignment information for PRACH which indicates UL frequency resource for a UE to transmit a PRACH message but also additional RB assignment information for an UL data channel which indicates UL frequency resource for the UE to transmit data on the UL data channel.

The transceiver 503 is arranged to transmit, in step S103' of the method 100', the scheduling message on a DL channel to the UE.

In particular, in Scenario 1 where the UE is in the RRC_Connected state but loses its UL synchronization, the transceiver 503 is configured to transmit, in step S203', the scheduling message by means of DCI on a DL control channel.

In another embodiment applied in Scenario 1, the transceiver 503 is configured to transmit, in step S303', the scheduling message by means of a MAC control element on a DL data channel.

In Scenario 2 where the UE is in the RRC_Idle state, the transceiver 503 is configured to transmit, in step S403', the scheduling message by means of DCI on a DL control channel, the DCI containing both the RB assignment information for PRACH and the RB assignment information for the UL data channel; and transmit, in step S405', data on a DL data channel associated with the DL control channel, wherein the data transmitted on the associated DL data channel comprise a paging message including a UE ID of the UE, so that the UE can verify, based on the UE ID, that the obtained scheduling message is transmitted for its own.

In the two-step process, the PRACH message and the data on the UL data channel are transmitted at the same subframe. The approaches of scheduling the UL time resource for the UE to transmit the PRACH message and to transmit the data on the UL data channel in the methods 200'-400' are identical with those in the methods 200-400, and thus description thereof will be omitted here for simplicity.

Hereinafter, scheduled PRACH transmission methods at the UE side according to embodiments of the present disclosure will be described with reference to FIGS. 6-9, which are applied in the four-step process as previously described.

Figure 6:
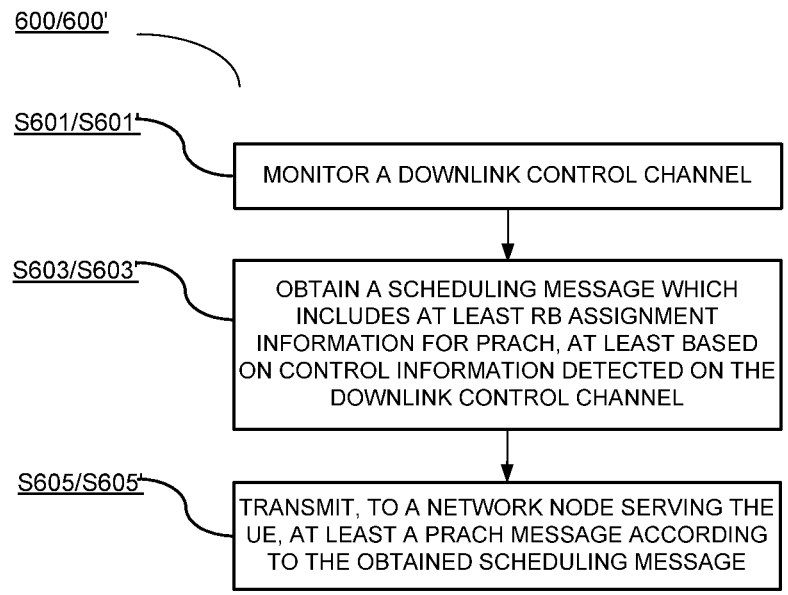
FIG. 6 illustratively shows a flowchart of a scheduled PRACH transmission method according to an exemplary embodiment of the present disclosure.

First, with reference to FIG. 6, FIG. 6 illustratively shows a flowchart of a general scheduled PRACH transmission method according to an exemplary embodiment of the present disclosure.

As shown in FIG. 6, the method 600 performed at a UE may comprise steps S601, S603 and S605.

In step S601, the UE monitors a DL control channel. Once control information which indicates data transmitted on the associated DL data channel is detected on the DL control channel, the UE obtains, in step S603, a scheduling message which includes at least resource block RB assignment information for PRACH at least based on the control information on the DL control channel (in some case, based on the control information on the DL control channel as well as the data transmitted on the associated DL data channel, which will be described later). The RB assignment information for PRACH indicates UL frequency resource, i.e., PRBs, for the UE to transmit a PRACH message (MSG1). Besides the RB assignment information, the scheduling message may include MCS, subframe assignment information which indicates UL time resource, i.e., a subframe, scheduled by the network node for the UE to transmit the PRACH message and will be described later, etc.

Then in step S605, the UE transmits, to a network node serving the UE, the PRACH message on a random access channel according to the obtained scheduling message.

As previously discussed, Since UE has three RRC states in the next generation of wireless communication network, i.e., a RRC_Connected state, a RRC_Idle state, and a RRC_Dormant state, there may be three different scenarios corresponding to the three RRC states of the UE to be considered for particular implementations of the method 600.

Scenario 1: UE is in the RRC_Connected state, but loses its UL synchronization with the network node;
Scenario 2: UE is in the RRC_Idle state; and
Scenario 3: UE is in the RRC_Dormant state.

It should be noted that since the RRC_Dormant state is an intermediate state between the RRC_Connected state and the RRC_Idle state, if a time period since the UE enters the RRC_Dormant state from the RRC_Connected state is no more than a predetermined threshold, the UE may use the same scheduled PRACH transmission method as that used in Scenario 1 for transmitting the PRACH message using the scheduled UL resource indicated in the scheduling message; and if a time period since the UE enters the RRC_Dormant state from the RRC_Connected state is more than the predetermined threshold, the UE may use the same scheduled PRACH transmission method as that used in Scenario 2 for transmitting the PRACH message using the scheduled UL resource indicated in the scheduling message.

Therefore, particular implementations of the scheduled PRACH transmission method 600 in Scenario 1 and Scenario 2 will be described in detail hereinafter with reference to FIGS. 7-8 and 9, respectively. Particular implementations of the scheduled PRACH transmission 600 for Scenario 3 will be omitted accordingly, and may refer to the descriptions for Scenario 2 and Scenario 1 depending on whether the time period since the UE enters the RRC_Dormant state from the RRC_Connected state is more than the predetermined threshold or not, respectively.

Figure 7:
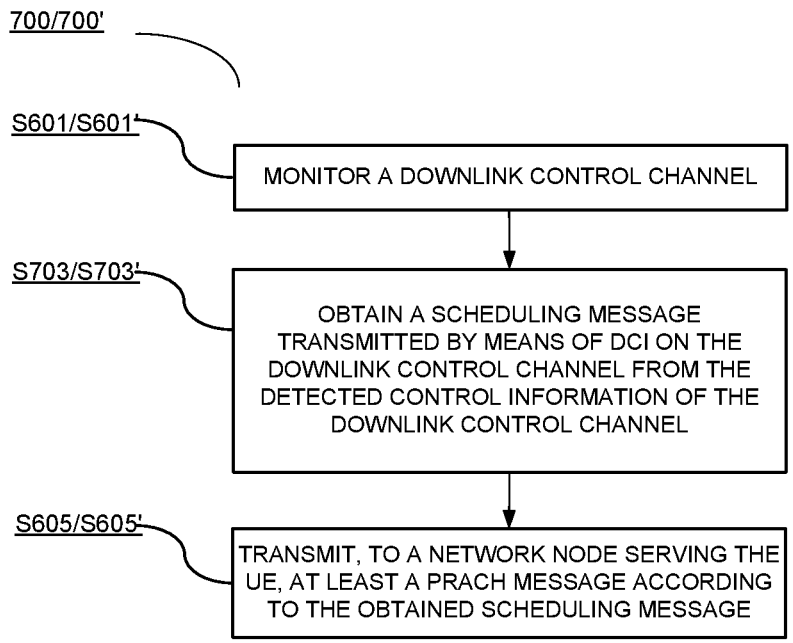
FIG. 7 illustratively shows a flowchart of a scheduled PRACH transmission method in a case that the UE is in a RRC_Connected state or that the UE has been in a RRC_Dormant state for no more than a predetermined period, according to an exemplary embodiment of the present disclosure.

FIG. 7 illustratively shows a flowchart of a scheduled PRACH transmission method applied in Scenario 1 according to an exemplary embodiment of the present disclosure, which corresponds to the PRACH scheduling method 200 as shown in FIG. 2 performed at the network node, where the scheduling message is transmitted on the DL control channel.

In Scenario 1, the UE is in the RRC_Connected state. Thus, the network node has UE context (especially, C-RNTI of the UE), and knows that the UE is within its cell. When the network node wants to transmit DL data to the UE, it notices that the UE loses its UL synchronization. Thus, the network node needs to trigger the UE to transmit PRACH on UL to get UL synchronized.

As shown in FIG. 7, the method 700 at the UE may comprise steps S601, S703 and S605.

In step S601, the UE monitors a DL control channel. Once control information which indicates data transmitted on the associated DL data channel is detected on the DL control channel, the UE may obtain, in step S703, the scheduling message transmitted by means of DCI on the DL control channel from the detected control information on the DL control channel. Then in step S605, the UE transmits, to the network node serving the UE, the PRACH message using the scheduled UL frequency resource indicated in the obtained scheduling message.

Regarding the UL time resource for the UE to transmit the PRACH message, in one implementation, the subframe for the UE to transmit the PRACH message may be predefined by specifications.

In another implementation, if there is more than one option for a subframe being scheduled to transmit the PRACH message, e.g., the UE may transmit the PRACH message at a subframe at which it receives the scheduling message, or at n subframes later than the subframe (n is a positive integer, e.g., 4), subframe arrangement information may be further included in the scheduling message for indicating the subframe scheduled by the network node for the UE to transmit the PRACH message.

The subframe assignment information may include information on a time interval between a subframe for scheduling the UL resource for the PRACH message and a subframe for transmitting the PRACH message.

Alternatively, the subframe assignment information may include information explicitly indicating which subframe is scheduled to transmit the PRACH message.

In another embodiment, the scheduling message may be transmitted on a DL data channel, e.g., PDSCH, instead of the DL control channel, which will be described with reference to FIG. 8, and corresponds to the PRACH scheduling method 300 as shown in FIG. 3 performed at the network node.

Figure 8:
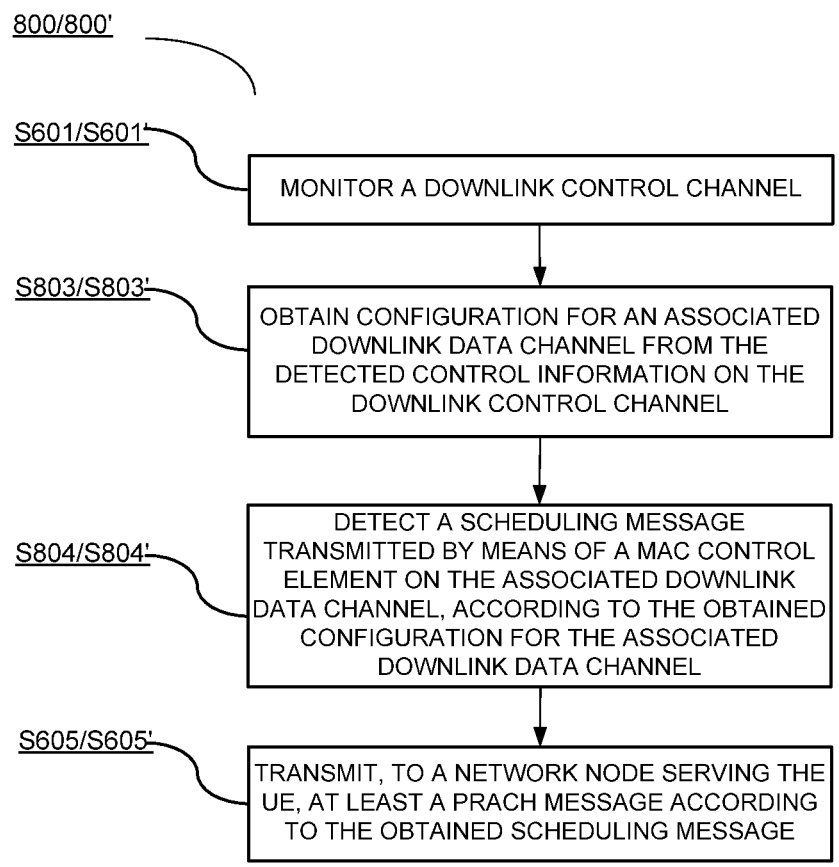
FIG. 8 illustratively shows a flowchart of a scheduled PRACH transmission method in a case that the UE is in a RRC_Connected state or that the UE has been in a RRC_Dormant state for no more than a predetermined period, according to another exemplary embodiment of the present disclosure.

FIG. 8 illustratively shows a flowchart of a scheduled PRACH transmission method applied in Scenario 1 according to the other embodiment of the present disclosure. The only difference from the embodiment as shown in FIG. 7 consists in that the scheduled PRACH transmission method 800 comprises steps S803 and S804, instead of step S703 in FIG. 7.

Once the control information which indicates the data transmitted on the associated DL data channel is detected by the UE on the DL control channel, the UE may obtain, in step S803, configuration for the associated DL data channel from the detected control information on the DL control channel without the scheduling message including the RB assignment information for PRACH, since in this embodiment, the scheduling message is transmitted by the network node on the associated DL data channel. Then in step S804, the UE may detect the scheduling message transmitted by means of a MAC control element on the associated DL data channel, according to the obtained configuration for the associated DL data channel.

The approaches of scheduling the UL time resource for the UE to transmit the PRACH message in the method 800 are identical with those in the method 700, and thus description thereof will be omitted here for simplicity.

Hereinafter, a particular implementation of the scheduled PRACH transmission method in Scenario 2 will be described in detail with reference to FIG. 9, which corresponds to the PRACH scheduling method 400 as shown in FIG. 4 performed at the network node. As shown in FIG. 9, the scheduled PRACH transmission method 900 may comprise steps S601, S903, S904 and S605.

In Scenario 2, the UE is in the RRC_Idle state. Thus, the network node does not know C-RNTI of the UE and where the UE is. As previously described, if the network node needs to send DL data to the UE, the network node needs to page the UE via P-RNTI, and transmits the scheduling message including the RB assignment information for PRACH on the DL control channel to a plurality of UEs which share the P-RNTI and receive the paging message at the same time (including the UE to which it intends to transmit the DL data).

Accordingly, at the UE side, once the control information which indicates the data transmitted on the associated DL data channel is detected by the UE on the DL control channel, the UE obtains, in step S903, based on the detected control information on the DL control channel, data transmitted on the DL data channel associated with the DL control channel, wherein the data transmitted on the associated DL data channel comprise a paging message including the UE ID of the UE. Then in step S904, the UE obtains the scheduling message transmitted by means of the DCI on the DL control channel, and verify, based on the UE ID, that the obtained scheduling message is just transmitted for it to transmit the PRACH message to initiate the random access procedure.

Then in step S605, the UE transmits, to the network node, the PRACH message using the scheduled UL resource indicated in the obtained scheduling message.

As previously described in the method 400, the RB assignment information can be contained in either the same DCI for paging or another DCI. Whether the UE needs to decode another DCI or not depends on one bit indicator in the DCI for normal paging. But of course, the scheme of the RB assignment information being included in another DCI may result in more overhead at UE side.

The approaches of scheduling the UL time resource for the UE to transmit the PRACH message in the method 900 are identical with those in the method 700, and thus description thereof will be omitted here for simplicity.

Hereinafter, scheduled PRACH transmission methods at the UE side according to embodiments of the present disclosure which are applied in the two-step process as previously described will be described, again with reference to FIGS. 6-9. As previously mentioned, in order to distinguish steps in the methods adapted to the two-step process and the methods adapted to the four-step process, "'" is additionally added to the reference numbers in FIGS. 6-9 when the methods adapted to the two-step process are described.

Most of steps in the methods 600'-900' are substantially identical with those described in the methods 600-900. The only difference consists in that the scheduling message obtained by the UE in the scheduled PRACH method 600'-900' includes not only the RB assignment information for PRACH, but also additional RB assignment information for an UL data channel, e.g., PUSCH, which schedules UL frequency resource for the UE to transmit data on the UL data channel. Therefore, the PRACH scheduling methods 600'-900' adapted to the two-step process performed at the UE side according to embodiments of the present disclosure will be simply described hereinafter with reference to FIGS. 6-9.

First, with reference to FIG. 6, FIG. 6 illustratively shows a flowchart of a general scheduled PRACH transmission method according to an exemplary embodiment of the present disclosure.

As shown in FIG. 6, the method 600' performed at a UE may comprise steps S601', S603' and S605'.

In step S601', the UE monitors a DL control channel. Once control information which indicates data transmitted on the associated DL data channel is detected on the DL control channel, the UE obtains, in step S603', a scheduling message which includes not only the RB assignment information for PRACH but also additional RB assignment information for the UL data channel at least based on the control information on the DL control channel, wherein the RB assignment information for PRACH is used for indicating UL frequency resource for the UE to transmit a PRACH message (MSG1), and the additional RB assignment information for the UL data channel is used for indicating UL frequency resource for the UE to transmit data (MSG3) on the UL data channel. Then in step S605', the UE transmits, to a network node serving the UE, the PRACH message on the random access channel according to the obtained scheduling message. Further, the method 600' further comprises: transmitting the UL data on the UL data channel indicated by the additional RB assignment information included in the obtained scheduling message.

In Scenario 1 where the UE is in the RRC_Connected state but loses its UL synchronization, the method 700' at the UE according to an exemplary embodiment of the present disclosure is applied, which may comprise steps S601', S703' and S605' as shown in FIG. 7.

In step S601', the UE monitors a DL control channel. Once control information which indicates data transmitted on the associated DL data channel is detected on the DL control channel, the UE may obtain, in step S703', the scheduling message transmitted by means of DCI on the DL control channel from the detected control information on the DL control channel. The RB assignment information for PRACH indicates PRBs scheduled by the network node for the UE to transmit the PRACH message, and the additional RB assignment information for the UL data channel indicates PRBs scheduled by the network node for the UE to transmit data on the UL data channel. Both the RB assignment information for PRACH and the additional RB assignment information for the UL data channel are contained in the DCI.

Then in step S605', the UE transmits, to the network node serving the UE, the PRACH message using the scheduled UL frequency resource indicated in the obtained scheduling message. Further, the method 600' further comprises: transmitting the UL data on the UL data channel indicated by the additional RB assignment information included in the obtained scheduling message.

In another embodiment applied in Scenario 1, the method 800' according to an exemplary embodiment of the present disclosure is applied, which may comprise steps S601', S803', S804' and S605' as shown in FIG. 8. The only difference from the embodiment as shown in FIG. 8 consists in that the method 800' comprises step S803' and S804', instead of step S703' in FIG. 7.

Once the control information which indicates the data transmitted on the associated DL data channel is detected by the UE on the DL control channel, the UE may obtain, in step S803', configuration for the associated DL data channel from the detected control information on the DL control channel without the scheduling message including the RB assignment information for PRACH and the additional RB assignment information for the UL data channel, since in this embodiment, the scheduling message is transmitted by the network node on the associated DL data channel. Then in step S804', the UE may detect the scheduling message transmitted by means of a MAC control element on the associated DL data channel, according to the obtained configuration for the associated DL data channel. In this embodiment, both the RB assignment information for PRACH which indicates PRB(s) scheduled by the network node for the UE to transmit the PRACH message and the additional RB assignment information for the UL data channel which indicates PRBs scheduled by the network node for the UE to transmit data on the UL data channel are contained in the MAC control element.

Figure 9:
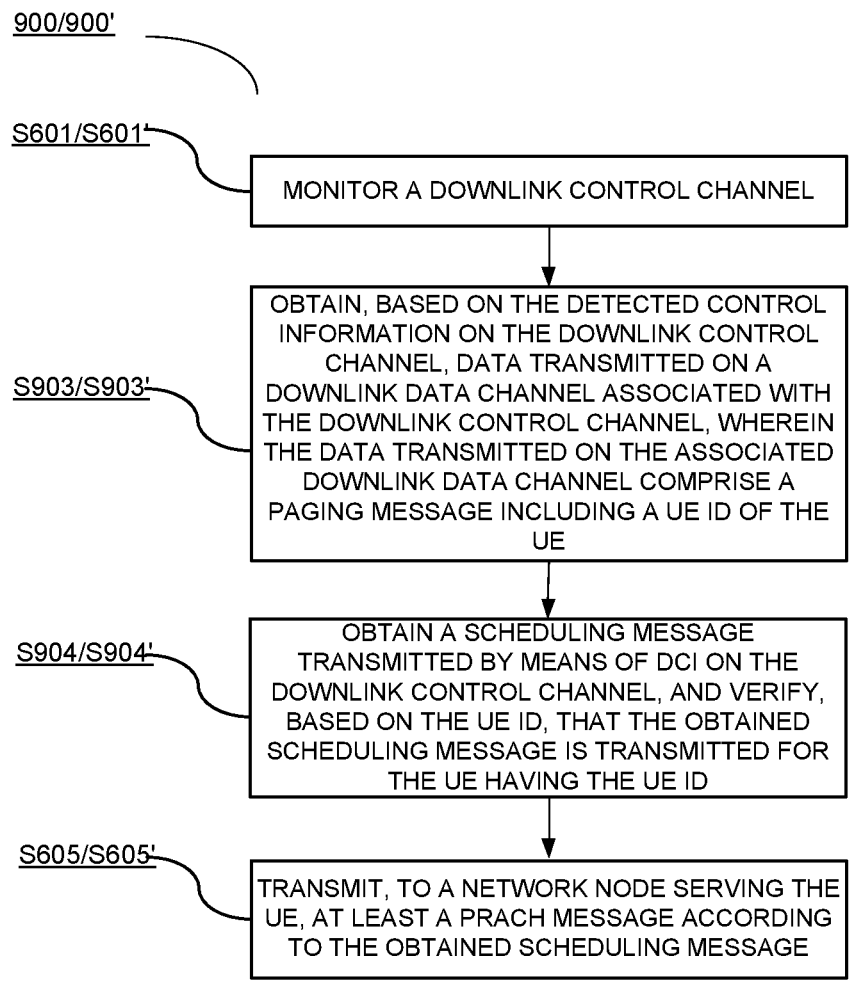
FIG. 9 illustratively shows a flowchart of a scheduled PRACH transmission method in a case that the UE is in a RRC_Idle state or that the UE has been in a RRC_Dormant state for more than a predetermined period, according to an exemplary embodiment of the present disclosure.

In Scenario 2 where the UE is in the RRC_Idle state, the method 900' according to an exemplary embodiment of the present disclosure is applied, which may comprise steps S601', S903', S904' and S605' as shown in FIG. 9.

In step S601', the UE monitors a DL control channel. Once the control information which indicates the data transmitted on the associated DL data channel is detected by the UE on the DL control channel, the UE obtains, in step S903', based on the detected control information on the DL control channel, data transmitted on the DL data channel associated with the DL control channel, wherein the data transmitted on the associated DL data channel comprise a paging message including the UE ID of the UE. Then in step S904', the UE obtains the scheduling message transmitted by means of the DCI on the downlink control channel, and verify, based on the UE ID, that the obtained scheduling message is transmitted for its own. Both the RB assignment information for PRACH and the additional RB assignment information for the UL data channel are contained in the DCI. As such, the UE knows from the paging message that the scheduling message is just for it to transmit the PRACH message to initiate the random access procedure and to transmit the UL data on the UL data channel.

Then in step S605', the UE transmits, to the network node serving the UE, the PRACH message using the scheduled UL frequency resource indicated in the obtained scheduling message.

In the two-step process, the PRACH message and the data on the UL data channel are transmitted at the same subframe. The approaches of scheduling the UL time resource for the UE to transmit the PRACH message and to transmit the data on the UL data channel in the methods 600'-900' are identical with those in the method 600-900, and thus description thereof will be omitted here for simplicity.

Figure 10:
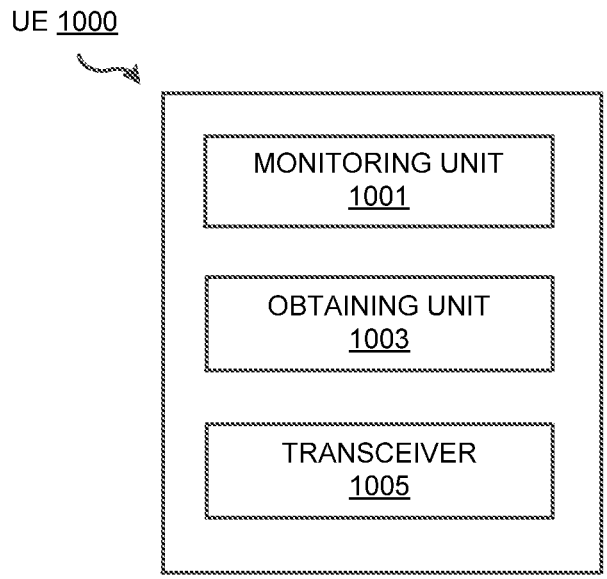
FIG. 10 illustratively shows a schematic structure diagram of a UE according to an exemplary embodiment of the present disclosure.

A structure of a UE will be described with reference to FIG. 10. FIG. 10 illustratively shows a schematic structure diagram of a UE 1000 according to an embodiment of the present disclosure. The UE 1000 in FIG. 10 may perform the methods 600-900 adapted to the four-step process as well as the methods 600'-900' adapted to the two-step process described previously with reference to FIGS. 6-9, respectively.

As shown in FIG. 6, the UE 1000 comprises a monitoring unit 1001, an obtaining unit 1003 and a transceiver 1005. As will be understood by the skilled in the art, common components in the UE 1000 are omitted in FIG. 10 for not obscuring the idea of the present disclosure.

In a case that the UE 1000 is applied in the four-step process, the monitoring unit 1001 is configured to monitor, in step S601 of the methods 600-900, a DL control channel. Once control information which indicates data transmitted on the associated DL data channel is detected by the monitoring unit 1001 on the DL control channel, the obtaining unit 1003 obtains, in step S603, a scheduling message which includes at least RB assignment information for PRACH at least based on the control information on the DL control channel, wherein the RB assignment information for PRACH is used for indicating UL frequency resource for the UE to transmit a PRACH message (MSG1). Then, the transceiver 1005 transmits, in step S605, to a network node serving the UE, the PRACH message on a random access channel according to the obtained scheduling message.

In particular, in Scenario 1 where the UE is in the RRC_Connected state but loses its UL synchronization, the obtaining unit 1003 is configured to obtain, in step S703, the scheduling message transmitted by means of DCI on the DL control channel from the detected control information on the DL control channel.

In another embodiment applied in Scenario 1, the obtaining unit 1003 is configured to obtain, in step S803, configuration for the associated DL data channel from the detected control information on the DL control channel without the scheduling message including the RB assignment information for PRACH, since in this embodiment, the scheduling message is transmitted by the network node on the associated DL data channel; and then to detect, in step S804, the scheduling message transmitted by means of a MAC control element on the associated DL data channel, according to the obtained configuration for the associated DL data channel.

In Scenario 2 where the UE is in the RRC_Idle state, the obtaining unit 1003 is configured to obtain, in step S903, based on the detected control information on the DL control channel, data transmitted on the DL data channel associated with the DL control channel, wherein the data transmitted on the associated DL data channel comprise a paging message including the UE ID of the UE; and then to obtain, in step S904, the scheduling message transmitted by means of the DCI on the DL control channel, and verify, based on the UE ID, that the obtained scheduling message is just transmitted for it to transmit the PRACH message to initiate the random access procedure.

Regarding the UL time resource for the UE to transmit the PRACH message, in one implementation, the subframe for the UE to transmit the PRACH message may be predefined by specifications.

In another implementation, the subframe assignment information may include information on a time interval between a subframe for scheduling the UL resource for the PRACH message and a subframe for transmitting the PRACH message. Alternatively, the subframe assignment information may include information explicitly indicating which subframe is scheduled to transmit the PRACH message.

In a case that the UE 1000 is applied in the two-step process, the monitoring unit 1001 is configured to monitor, in step S601' of the methods 600'-900', a DL control channel. Once control information which indicates data transmitted on the associated DL data channel is detected by the monitoring unit 1001 on the DL control channel, the obtaining unit 1003 obtains, in step S603', a scheduling message which includes not only RB assignment information for PRACH but also additional RB assignment information for a UL data channel at least based on the control information on the DL control channel, wherein the RB assignment information for PRACH is used for indicating UL frequency resource for the UE to transmit a PRACH message (MSG1), and the additional RB assignment information for the DL data channel is used for indicating UL resource for the UE to transmit data (MSG3) on the UL data channel. Then, the transceiver 1005 transmits, in step S605', to a network node serving the UE, the PRACH message on a random access channel according to the obtained scheduling message. And the transceiver 1005 further transmits the UL data on the UL data channel indicated by the additional RB assignment information included in the obtained scheduling message.

In particular, in Scenario 1 where the UE is in the RRC_Connected state but loses its UL synchronization, the obtaining unit 1003 is configured to obtain, in step S703', the scheduling message transmitted by means of DCI on the DL control channel from the detected control information on the DL control channel. Both the RB assignment information for PRACH and the RB assignment information for the DL data channel are contained in the DCI.

In another embodiment applied in Scenario 1, the obtaining unit 1003 is configured to obtain, in step S803', configuration for the associated DL data channel from the detected control information on the DL control channel without the scheduling message, since in this embodiment, the scheduling message is transmitted by the network node on the associated DL data channel; and then to detect, in step S804', the scheduling message transmitted by means of a MAC control element on the associated DL data channel, according to the obtained configuration for the associated DL data channel. Both the RB assignment information for PRACH and the RB assignment information for the DL data channel are contained in the MAC control element.

In Scenario 2 where the UE is in the RRC_Idle state, the obtaining unit 1003 is configured to obtain, in step S903', based on the detected control information on the DL control channel, data transmitted on the DL data channel associated with the DL control channel, wherein the data transmitted on the associated DL data channel comprise a paging message including the UE ID of the UE; and then to obtain, in step S904', the scheduling message transmitted by means of the DCI on the DL control channel, and verify, based on the UE ID, that the obtained scheduling message is transmitted for its own. Both the RB assignment information for PRACH and the RB assignment information for the DL data channel are contained in the DCI. As such, the UE knows from the paging message that the scheduling message is just for it to transmit the PRACH message to initiate the random access procedure and to transmit the data on the UL data channel.

In the two-step process, the PRACH message and the data on the UL data channel are transmitted at the same subframe. The approaches of scheduling the UL time resource for the UE to transmit the PRACH message and to transmit the data on the UL data channel in the methods 600'-900' are identical with those in the methods 600-900, and thus description thereof will be omitted here for simplicity.

Figure 11:
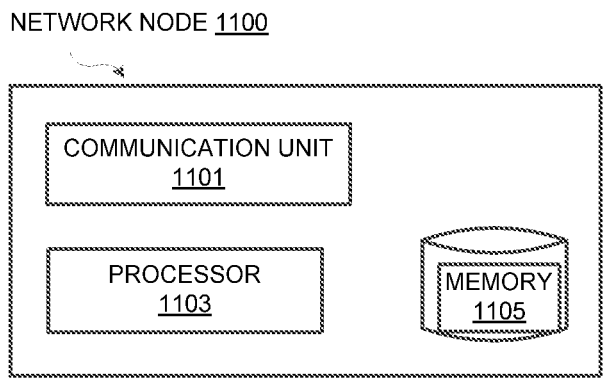
FIG. 11 illustratively shows a schematic structure diagram of a network node according to another exemplary embodiment of the present disclosure.

Hereinafter, another structure of a network node will be described with reference to FIG. 11. FIG. 11 illustratively shows a schematic structure diagram of a network node according to another embodiment of the present disclosure. The network node 1100 in FIG. 11 may perform the methods 100-400 described previously with reference to FIGS. 1-4.

As shown in FIG. 11, the network node 1100 comprises at least one controller or processor 1103 comprising e.g., any suitable Central Processing Unit, CPU, microcontroller, Digital Signal Processor, DSP, etc., capable of executing computer program code. The computer program code may be stored in a memory 705. The memory 1105 may be any combination of a RAM (Random Access Memory) and a ROM (Read Only Memory). The memory may also comprise persistent storage, which, for example, can be any single one or combination of magnetic memory, optical memory, or solid state memory or even remotely mounted memory. The example network node 1100 further comprises a communication interface 1101 arranged for wireless communication with other devices or nodes, such as a UE served by the network node.

The computer program code, when loaded from the memory 1105 and run in the processor 1103, causes network node 1100 to perform the methods according to the disclosure, such as the methods 100-400 and 100'-400' as previously described.

In a case that the network node 500 is applied in the four-step process, the computer program code, when executed, cause network node 1100 to generate, in step S101 of the methods 100-400, a scheduling message which includes RB assignment information for PRACH, the RB assignment information for PRACH indicating UL frequency resource for a UE to transmit a PRACH message; and to transmit, in step S103 of the method 100, the scheduling message on a DL channel to the UE.

In particular, in Scenario 1 where the UE is in the RRC_Connected state but loses its UL synchronization, the computer program code, when executed, cause network node 1100 to transmit, in step S203, the scheduling message by means of DCI on a DL control channel.

In another embodiment applied in Scenario 1, the computer program code, when executed, cause network node 1100 to transmit, in step S303, the scheduling message by means of a MAC control element on a DL data channel.

In Scenario 2 where the UE is in the RRC_Idle state, the computer program code, when executed, cause network node 1100 to transmit, in step S403, the scheduling message by means of DCI on a DL control channel; and transmit, in step S405, data on a DL data channel associated with the DL control channel, wherein the data transmitted on the associated DL data channel comprise a paging message including a UE ID of the UE, so that the UE can verify, based on the UE ID, that the obtained scheduling message is transmitted for its own.

Regarding the UL time resource for the UE to transmit the PRACH message, in one implementation, the subframe for the UE to transmit the PRACH message may be predefined by specifications.

In another implementation, the subframe assignment information may include information on a time interval between a subframe for scheduling the UL resource for the PRACH message and a subframe for transmitting the PRACH message. Alternatively, the subframe assignment information may include information explicitly indicating which subframe is scheduled to transmit the PRACH message.

In a case that the network node 1100 is applied in the two-step process, the computer program code, when executed, cause network node 1100 to generate, in step S101' of the methods 100'-400', a scheduling message which includes not only RB assignment information for PRACH but also additional RB assignment information for an UL data channel.

The computer program code, when executed, cause network node 1100 to transmit, in step S103' of the method 100', the scheduling message on a DL channel to the UE.

In particular, in Scenario 1 where the UE is in the RRC_Connected state but loses its UL synchronization, the computer program code, when executed, cause network node 1100 to transmit, in step S203', the scheduling message by means of DCI on a DL control channel. Both the RB assignment information for PRACH and the additional RB assignment information for the UL data channel are contained in the DCI.

In another embodiment applied in Scenario 1, the computer program code, when executed, cause network node 1100 to transmit, in step S303', the scheduling message by means of a MAC control element on a DL data channel. Both the RB assignment information for PRACH and the additional RB assignment information for the UL data channel are contained in the MAC control element.

In Scenario 2 where the UE is in the RRC_Idle state, the computer program code, when executed, cause network node 1100 to transmit, in step S403', the scheduling message by means of DCI on a DL control channel, wherein both the RB assignment information for PRACH and the additional RB assignment information for the UL data channel are contained in the DCI; and transmit, in step S405', data on a DL data channel associated with the DL control channel, wherein the data transmitted on the associated DL data channel comprise a paging message including a UE ID of the UE, so that the UE can verify, based on the UE ID, that the obtained scheduling message is transmitted for its own.

In the two-step process, the PRACH message and the data on the UL data channel are transmitted at the same subframe. The approaches of scheduling the UL time resource for the UE to transmit the PRACH message and to transmit the data on the UL data channel in the methods 200'-400' are identical with those in the methods 200-400, and thus description thereof will be omitted here for simplicity.

Figure 12:
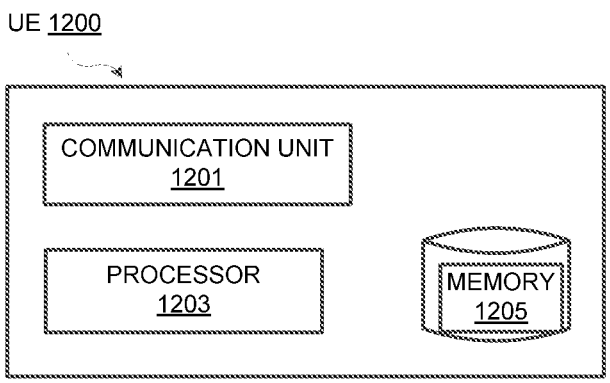
FIG. 12 illustratively shows a schematic structure diagram of a UE according to another exemplary embodiment of the present disclosure.

Hereinafter, another structure of a UE will be described with reference to FIG. 12. FIG. 12 illustratively shows a schematic structure diagram of a UE according to another embodiment of the present disclosure. The UE 1200 in FIG. 12 may perform the methods 600-900 and 600'-900' described previously with reference to FIGS. 6-9.

As shown in FIG. 12, the UE 1200 comprises at least one controller or processor 1203 comprising e.g., any suitable Central Processing Unit, CPU, microcontroller, Digital Signal Processor, DSP, etc., capable of executing computer program code. The computer program code may be stored in a memory 1205. The memory 1205 may be any combination of a RAM (Random Access Memory) and a ROM (Read Only Memory). The memory may also comprise persistent storage, which, for example, can be any single one or combination of magnetic memory, optical memory, or solid state memory or even remotely mounted memory. The example UE 1200 further comprises a communication interface 1201 arranged for wireless communication with other devices or nodes, such as the network node serving the UE.

The computer program code, when loaded from the memory 1205 and run in the processor 1203, causes the UE 1200 to perform the methods according to the disclosure, such as the methods 600-900 and 600'-900' as previously described.

In an embodiment, the computer program code, when executed, cause the UE 1200 to monitor, in step S1201, monitor, in step S601 of the methods 600-900, a DL control channel. Once control information which indicates data transmitted on the associated DL data channel is detected on the DL control channel, the computer program code, when executed, cause the UE 1200 to obtain, in step S603, a scheduling message which includes at least RB assignment information for PRACH at least based on the control information on the DL control channel, wherein the RB assignment information for PRACH is used for indicating UL frequency resource for the UE to transmit a PRACH message (MSG1). Then, the computer program code, when executed, cause the UE 1200 to transmit, in step S605, to a network node serving the UE, the PRACH message on a random access channel according to the obtained scheduling message.

In particular, in Scenario 1 where the UE is in the RRC_Connected state but loses its UL synchronization, the computer program code, when executed, cause the UE 1200 to obtain, in step S703, the scheduling message transmitted by means of DCI on the DL control channel from the detected control information on the DL control channel.

In another embodiment applied in Scenario 1, the computer program code, when executed, cause the UE 1200 to obtain, in step S803, configuration for the associated DL data channel from the detected control information on the DL control channel without the scheduling message including the RB assignment information for PRACH, since in this embodiment, the scheduling message is transmitted by the network node on the associated DL data channel; and then to detect, in step S804, the scheduling message transmitted by means of a MAC control element on the associated DL data channel, according to the obtained configuration for the associated DL data channel.

In Scenario 2 where the UE is in the RRC_Idle state, the computer program code, when executed, cause the UE 1200 to obtain, in step S903, based on the detected control information on the DL control channel, data transmitted on the DL data channel associated with the DL control channel, wherein the data transmitted on the associated DL data channel comprise a paging message including the UE ID of the UE; and then to obtain, in step S904, the scheduling message transmitted by means of DCI on the DL control channel, and verify, based on the UE ID, that the obtained scheduling message is transmitted for its own. As such, the UE knows from the paging message that the scheduling message is just for it to transmit the PRACH message to initiate the random access procedure.

Regarding the UL time resource for the UE to transmit the PRACH message, in one implementation, the subframe for the UE to transmit the PRACH message may be predefined by specifications.

In another implementation, the subframe assignment information may include information on a time interval between a subframe for scheduling the UL resource for the PRACH message and a subframe for transmitting the PRACH message. Alternatively, the subframe assignment information may include information explicitly indicating which subframe is scheduled to transmit the PRACH message.

In a case that the UE 1200 is applied in the two-step process, the computer program code, when executed, cause the UE 1200 to monitor, in step S601' of the methods 600'-900', a DL control channel. Once control information which indicates data transmitted on the associated DL data channel is detected on the DL control channel, the computer program code, when executed, cause the UE 1200 to obtain, in step S603', a scheduling message which includes not only RB assignment information for PRACH but also additional RB assignment information for a UL data channel at least based on the control information on the DL control channel, wherein the RB assignment information for PRACH is used for indicating UL frequency resource for the UE to transmit a PRACH message (MSG1), and the additional RB assignment information for the DL data channel is used for indicating UL frequency resource for the UE to transmit data (MSG3) on the UL data channel. Then, the computer program code, when executed, cause the UE 1200 to transmit, in step S605', to a network node serving the UE, the PRACH message on a random access channel according to the obtained scheduling message.

In particular, in Scenario 1 where the UE is in the RRC_Connected state but loses its UL synchronization, the computer program code, when executed, cause the UE 1200 to obtain, in step S703', the scheduling message transmitted by means of DCI on the DL control channel from the detected control information on the DL control channel. Both the RB assignment information for PRACH and the additional RB assignment information for the UL data channel are contained in the DCI.

In another embodiment applied in Scenario 1, the computer program code, when executed, cause the UE 1200 to obtain, in step S803', configuration for the associated DL data channel from the detected control information on the DL control channel without the scheduling message, since in this embodiment, the scheduling message is transmitted by the network node on the associated DL data channel; and then to detect, in step S804', the scheduling message transmitted by means of a MAC control element on the associated DL data channel, according to the obtained configuration for the associated DL data channel. Both the RB assignment information for PRACH and the additional RB assignment information for the UL data channel are contained in the MAC control element.

In Scenario 2 where the UE is in the RRC_Idle state, the computer program code, when executed, cause the UE 1200 to obtain, in step S903', based on the detected control information on the DL control channel, data transmitted on the DL data channel associated with the DL control channel, wherein the data transmitted on the associated DL data channel comprise a paging message including the UE ID of the UE; and then to obtain, in step S904', the scheduling message transmitted by means of the DCI on the DL control channel, and verify, based on the UE ID, that the obtained scheduling message is transmitted for its own. Both the RB assignment information for PRACH and the additional RB assignment information for the UL data channel are contained in the DCI. As such, the UE knows from the paging message that the scheduling message is just for it to transmit the PRACH message to initiate the random access procedure and to transmit the UL data on the UL data channel.

In the two-step process, the PRACH message and the data on the UL data channel are transmitted at the same subframe. The approaches of scheduling the UL time resource for the UE to transmit the PRACH message and to transmit the data on the UL data channel in the methods 600'-900' are identical with those in the methods 600-900, and thus description thereof will be omitted here for simplicity.

According to foregoing embodiments of the disclosure, the disclosure has at least the following advantages:

By providing a resource scheduling mechanism for PRACH at the network node side and providing an on-demand scheduled PRACH transmission mechanism at the UE side, PRACH can be transmitted very flexibly at any subframe and at any PRB where it is necessary. The delay incurred in the random access procedure using the RRC-configured PRACH mechanism in which the resource for PRACH is configured by the RRC message as previously discussed may be reduced. Furthermore, if different UEs use the scheduled PRACH transmissions, there is no collision caused by the RRC-configured PRACH transmission mechanism as previously discussed, since each UE is scheduled for its PRACH transmission.

The foregoing description of implementations provides illustration and description, but is not intended to be exhaustive or to limit the disclosure to the precise form disclosed. Modifications and variations are possible in light of the above teachings, or may be acquired from practice of the disclosure.

Aspects of the disclosure may also be embodied as methods and/or computer program products. Accordingly, the disclosure may be embodied in hardware and/or in hardware/software (including firmware, resident software, microcode, etc.). Furthermore, the embodiments may take the form of a computer program product on a computer-usable or computer-readable storage medium having computer-usable or computer-readable program code embodied in the medium for use by or in connection with an instruction execution system. Such instruction execution system may be implemented in a standalone or distributed manner. The actual software code or specialized control hardware used to implement embodiments described herein is not limiting of the disclosure. Thus, the operation and behavior of the aspects were described without reference to the specific software code, it being understood that those skilled in the art will be able to design software and control hardware to implement the aspects based on the description herein.

Furthermore, certain portions of the disclosure may be implemented as "logic" that performs one or more functions. This logic may include hardware, such as an application specific integrated circuit or field programmable gate array or a combination of hardware and software.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the disclosure should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description gives only the embodiments of the present disclosure and is not intended to limit the present disclosure in any way. Thus, any modification, substitution, improvement or like made within the spirit and principle of the present disclosure should be encompassed by the scope of the present disclosure.

What is claimed is:

1. A network node, comprising:
  a communication interface arranged for wireless communication,
  one or more processors, and
  a memory including instructions that, when executed by said one or more processors,
    cause said network node to:
  generate a scheduling message that includes at least resource block (RB) assignment information for a physical random access channel (PRACH), the RB assignment information for PRACH indicating an uplink resource for a user equipment (UE) to transmit a PRACH message,
  wherein the PRACH message is a random access preamble, wherein the scheduling message further includes subframe assignment information that indicates a subframe scheduled by the network node for the UE to transmit at least the PRACH message, wherein the subframe assignment information includes information on a time interval between a subframe for scheduling at least the uplink resource for the PRACH message and the subframe for transmitting at least the PRACH message, and wherein the scheduling message further includes additional RB assignment information for an uplink data channel, the additional RB assignment information indicating an uplink resource for the UE to transmit data on the uplink data channel;
  transmit the scheduling message on a downlink channel to the UE; and
cause the network node to transmit the scheduling message on the downlink channel to the UE include instructions that, when executed by said one or more processors, cause the network node to, in the event that the UE is in a radio resource control RRC_Idle state or a time period since the UE enters an RRC_Dormant state from an RRC_Connected state is more than a predetermined threshold:
  transmit the scheduling message by means of downlink control information (DCI) on a downlink control channel; and
  transmit data on a downlink data channel associated with the downlink control channel,
    wherein the data transmitted on the associated downlink data channel comprise a paging message including a UE ID of the UE.

2. The network node of claim 1, wherein the instructions that, when executed by said one or more processors, cause the network node to transmit the scheduling message on the downlink channel to the UE include instructions that, when executed by said one or more processors, cause the network node to, in the event that the UE is in a radio resource control RRC_Connected state or a time period since the UE enters an RRC_Dormant state from the RRC_Connected state is not more than a predetermined threshold:
  transmit the scheduling message by means of downlink control information (DCI) on a downlink control channel; or
  transmit the scheduling message by means of a MAC control element on a downlink data channel.

3. The network node of claim 1, wherein the scheduling message further includes modulation and coding scheme for the UE to transmit the PRACH message.

4. A method at a user equipment (UE), the method comprising:
  monitoring a downlink control channel;
  when control information on the downlink control channel is detected, obtaining a scheduling message that includes at least resource block (RB) assignment information for a physical random access channel (PRACH), the RB assignment information for the PRACH indicating an uplink resource for the UE to transmit a PRACH message, at least based on the control information on the downlink control channel,
  wherein the PRACH message is a random access preamble, wherein the obtained scheduling message further includes subframe assignment information that indicates a subframe scheduled, by a network node serving the UE, for the UE to transmit at least the PRACH message, wherein the subframe assignment information includes information on a time interval between a subframe for scheduling at least the uplink resource for the PRACH message and the subframe for transmitting at least the PRACH message, and wherein the scheduling message further includes additional RB assignment information for an uplink data channel, and wherein the method further comprises transmitting uplink data on the uplink data channel indicated by the additional RB assignment information; and
  transmitting, to the network node serving the UE, at least the PRACH message according to the obtained scheduling message,
wherein in the event that the UE is in a radio resource control RRC_Idle state or a time period since the UE enters an RRC_Dormant state from an RRC_Connected state is more than a predetermined threshold, obtaining the scheduling message comprises:
  obtaining, based on the detected control information on the downlink control channel, data transmitted on a downlink data channel associated with the downlink control channel, wherein the data transmitted on the associated downlink data channel comprises a paging message including a UE ID of the UE.

5. The method of claim 4, wherein in the event that the UE is in a radio resource control RRC_Connected state or a time period since the UE enters an RRC_Dormant state from the RRC_Connected state is not more than a predetermined threshold, obtaining the scheduling message comprises:
  obtaining the scheduling message transmitted by means of downlink control information (DCI) on the downlink control channel; or
  obtaining configuration for an associated downlink data channel from the detected control information on the downlink control channel, and obtaining the scheduling message transmitted by means of a MAC control element on the associated downlink data channel, according to the obtained configuration for the associated downlink data channel.

6. The method of claim 4, wherein the obtained scheduling message further includes modulation and coding scheme for the UE to transmit the PRACH message.

7. A user equipment (UE), comprising:
a communication interface arranged for wireless communication,
one or more processors, and
a memory including instructions that, when executed by said one or more processors,
cause said UE to:
monitor a downlink control channel;
when control information on the downlink control channel is detected, obtain a scheduling message that includes at least resource block (RB) assignment information for a physical random access channel (PRACH), the RB assignment information for the PRACH indicating an uplink resource for the UE to transmit a PRACH message, at least based on the control information on the downlink control channel,
wherein the PRACH message is a random access preamble, wherein the obtained scheduling message further includes subframe assignment information that indicates a subframe scheduled, by the network node serving the UE, for the UE to transmit at least the PRACH message, and wherein the subframe assignment information includes information on a time interval between a subframe for scheduling at least the uplink resource for the PRACH message and the subframe for transmitting at least the PRACH message, wherein the scheduling message further includes additional RB assignment information for an uplink data channel, and wherein the instructions include instructions that, when executed by said one or more processors, cause the UE to transmit uplink data on the uplink data channel indicated by the additional RB assignment information; and
transmit, to the network node serving the UE, at least the PRACH message according to the obtained scheduling message,
wherein the instructions that, when executed by said one or more processors, cause the UE to obtain the scheduling message include instructions that, when executed by said one or more processors, cause the UE to, in the event that the UE is in a radio resource control RRC_Idle state or a time period since the UE enters an RRC_Dormant state from an RRC_Connected state is more than a predetermined threshold:
obtain, based on the detected control information on the downlink control channel, data transmitted on a downlink data channel associated with the downlink control channel, wherein the data transmitted on the associated downlink data channel comprises a paging message including a UE ID of the UE.

8. The UE of claim 7, wherein the instructions that, when executed by said one or more processors, cause the UE to obtain the scheduling message include instructions that, when executed by said one or more processors, cause the UE to, in the event that the UE is in a radio resource control RRC_Connected state or a time period since the UE enters an RRC_Dormant state from the RRC_Connected state is not more than a predetermined threshold:
obtain the scheduling message transmitted by means of downlink control information (DCI) on the downlink control channel; or
obtain configuration for an associated downlink data channel from the detected control information on the downlink control channel; and obtain the scheduling message transmitted by means of a MAC control element on the associated downlink data channel, according to the obtained configuration for the associated downlink data channel.

9. The UE of claim 7, wherein the obtained scheduling message further includes modulation and coding scheme for the UE to transmit the PRACH message.

* * * * *